ON-OFF TRANSDUCER

Filed May 27, 1965

INVENTOR
JOHN HARLEY
BY Fraser and Bogucki
ATTORNEYS

INVENTOR
JOHN HARLEY
BY Fraser and Bogucki
ATTORNEYS

United States Patent Office 3,449,689

Patented June 10, 1969

3,449,689

ON-OFF TRANSDUCER

John Harley, 255 Brooklyn Ave., Pretoria, Transvaal, Republic of South Africa

Filed May 27, 1965, Ser. No. 459,473

Int. Cl. H03f *1/14*; H03k *17/00*; H03d *1/06*

U.S. Cl. 330—51 7 Claims

ABSTRACT OF THE DISCLOSURE

An electronic on-off signal transducer is provided which converts an input signal into an output signal which is a substantial reproduction of the waveform of the input signal. The output signal is continuously fed back for comparison with the coexisting input signal and is modified to reduce any variations therebetween which exceed a predetermined threshold.

This invention relates to electronic on-off transducers. An electronic on-off transducer is defined as electronic means for the conversion of voltage and/or current and/or power between input and output terminals, and in which the active elements performing the conversion in the output stage are so arranged and connected to provide only low conductance state or high conductance from the power source to the load at the output terminals, the alternate high and low conductance states being so controlled in time from the input terminals as to provide the desired output characteristic. By this means improved power utilization efficiency in consequence of the minimization of power losses in the electronic on-off transducer resulting from the existence of high and low conductance states only, is achieved. Furthermore greater independence from variation of device parameters is achieved.

In a number of applications it is desirable that the output voltage and/or current and/or power wave form or a conversion of one of these into the other shall be reproduced in amplified form with a minimum of distortion, such as in speech and music amplifying means connected to loudspeaking means, the input being derived from a microphone or turntable pickup or the like.

A known method which embodies an on-off transducer and acts as such an amplifier makes use of a modulator in cascade with a demodulator. The modulator converts the continuous wave of the input signal into a series of pulses according to a given scheme; for example, pulse amplitude modulation, pulse width modulation, pulse frequency modulation, or a combination of these so that the modulation contains the information in the signal to be amplified. Subsequently the signal information is recovered by the demodulator. The combination switching circuits, modulating circuits, demodulating circuits and possibly negative feedback circuits which may be used for decreasing the distortion leads to complexity, a multiplicity of elements with resulting high cost and lack of reliability, and additional power losses in the auxiliary circuits. However this invention is not confined to amplifiers, and the invention may be used in combination with D-C power supplies, D-C transformers, voltage regulators, etc.

It is an object of the present invention to provide a simplified electronic on-off transducer.

It is further an object of the invention to provide an improved output characteristic which is more independent of fluctuations of the power supply, electrical energy storage means and of the external load associated with the output terminals than has heretofore been available.

It is further an object of the invention to achieve the above objects with a minimum of components.

In this specification the term "two state level discriminator" is a circuit in which the output can be essentially in only one of two states dependent upon which of two specified differences in level between two electrical signals is exceeded.

An electronic on-off transducer according to the invention may comprise a two state level discriminator with an output dependent on essentially instantaneous differences between a signal level derived from the transducer input and a signal level derived from the transducer output, said discriminator output controlling essentially instantaneously switching means which controls the energy flow from a power supply to the load, with which load is associated energy storage means, so that the changes in the transducer output signal level in the periods between switchings are relatively slow compared with the time required for said discriminator and switching action to take place, the switching means being so controlled by the level discriminator that departure of the actual transducer output signal level from the desired transducer output signal level is opposed.

The desired transducer output signal level is substantially of the same form and may be of the same magnitude as the transducer input signal level except that it has a perturbation superimposed on it with a fundamental frequency which is the frequency of switching. The changes in the transducer output signal level in the periods between switchings are at least the same but preferably faster compared with the largest anticipated signal rise time, a practical value for small distortion being twice as fast. The switching means which controls the energy flow from the power supply is preferably connected directly to the energy storage means. The switching means may also be integral with the two state level discriminator by contributing towards its operation. The energy storage means is preferably connected directly to the load and may be in series with or in parallel with the load or in any combination of these.

The signal level derived from the transducer output which is fed to the two state level discriminator for control thereof is preferably in constant fixed ratio to the transducer output signal level by connection of a resistive voltage divider between the output load and the input to the two state level discriminator, or may be the output itself; however in order to obtain special effects, such as a variable sensitivity of the said discriminator with the level of the signal or with the frequency of the signal, the control signal level may be non-linearly related to the transducer output by the use, between the load and the input to the discriminator, of a variable resistance or of frequency dependent networks respectively, or by another network capable of producing the desired effect.

Further according to an aspect of the invention the storage means may or may not be lossless, depending on the particular operation desired. In accordance with a further aspect of the invention, a non-resistive load may be employed as the storage network.

To illustrate the invention in detail, specific embodiments thereof are described hereunder with reference to the accompanying drawings in which.

Figure 1:
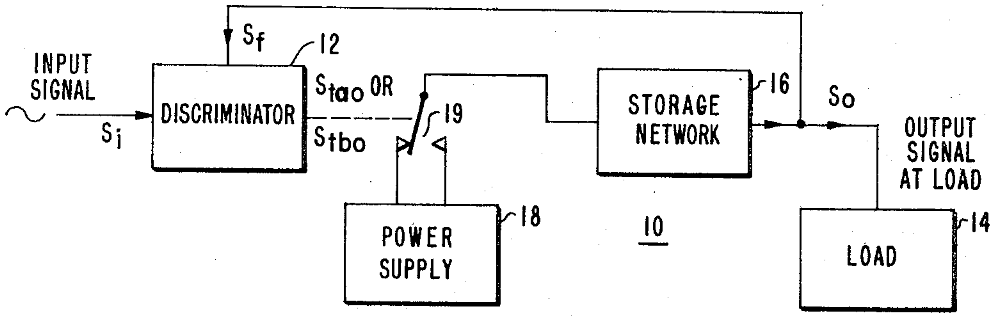
FIG. 1 is a block diagram of a first embodiment of the invention.

In the on-off transducer 10 of FIG. 1 a two state level discriminator 12, used as a signal level comparator, is shown to which are coupled two signals, $S_i$ and $S_f$, where $S_i$ is the transducer input signal and $S_f$ is a signal taken directly from the transducer output $S_o$ where the load 14 is connected.

The output signals $S_t$ of the discriminator 12 are designated $S_{tao}$ and $S_{tbo}$. These designations represent the differences between the signals $S_i$ and $S_f$ which are $S_t=(\pm S_i \mp S_f)$. When $S_t$ increases to reach a value $S_{ta}$ the discriminator 12 flips essentially instantaneously to one state giving an output $S_{toa}$, and when $S_t$ decreases to a value $S_{tb}$ it flips to the other state giving an ouput $S_{tbo}$. In flipping between the two states the discriminator 12 causes alternately two different voltages, constituting upper and lower discrete potential levels, from a power supply 18 to be switched to storage network 16, as shown in FIG. 1, or it may switch a single voltage of a power supply 18 on and off relative to the storage network 16 by means of a switch such as 19. In all cases, however, the switching is in a direction so as to tend to keep $S_t$ between $S_{ta}$ and $S_{tb}$, the limits at which switching occurs.

Figure 2:
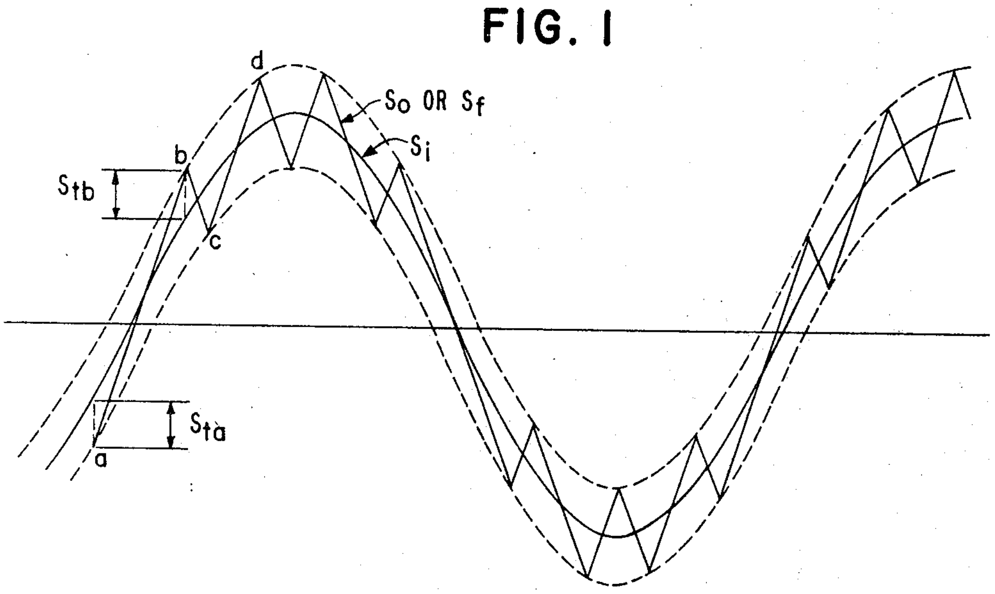
FIG. 2 is a graphical representation of corresponding input and output waveforms for the embodiment of FIG. 1.

In FIG. 2 is shown a representative input waveform $S_i$ as a portion of a sine wave which will be assumed to be a voltage wave. If the output voltage at the load 14 is $S_o$ and it is fed back to the discriminator 12 without attenuation then $S_o=S_f$. Consider that the voltage $S_o(=S_f)$ at a particular instant is $a$ as shown. The difference between $S_f$ and $S_i$ is here $S_i-a=S_{ta}$. Consider that the voltage $S_o(=S_f)$ at another instant is $b$ as shown, then the difference between $S_f$ and $S_i=b-S_i=S_{tb}$.

As stated above, the circuit of FIG. 1 is so arranged that when the input signal $S_i$ and the signal derived from the load $S_f$ differ by an amount $S_{ta}$ the two state level discriminator assumes a state which causes the switch 19 to connect the storage network 16 to the power supply 18 in such a manner that the flow of energy through the storage network 16 increases and hence the output increases. When the difference between the input signal $S_i$ and the resulting increasing signal $S_f$ reaches the value $S_{tb}$ the discriminator 12 causes the storage network 16 to be switched to the power supply 18 in such a manner that the output of the storage network 16 starts to decrease until the difference between $S_i$ and $S_f$ is once again $S_{ta}$ and the whole cycle repeats itself. Thus, with a sinusoidal signal input to the discriminator 12 the output of the storage network 16 (which is the output to the load 14) will consist of a waveform substantially the same as $S_i$ except that it will have a perturbation superimposed on it. The dotted lines in FIG. 2 show the envelope of the perturbation which is superimposed on the sinusoidal signal.

In FIG. 2 the two specified differences in level at which the two state level discriminator 12 will change state are $S_{te}$ and $S_{tb}$ and the more sensitive the discriminator 12 the smaller are these values. The rates of change in the transducer output signal level in the periods between switchings are the average slopes of the line segments *ab*, *bc*, *cd*, etc. which represent portions of the charge-discharge curves developed by the filter storage network 16. These rates are virtually determined by the storage network time constant in combination with the magnitude of the load 14 together with the voltage of the power supply 18. These rates of change given by the magnitude of the average slopes of *ab*, *bc*, *cd*, must be greater than the magnitude of the greatest slopes of the sine wave $S_i$ in order that the transducer output signal does not stray outside the envelope shown. To reduce the magnitude of the perturbation so that the envelope shown dotted in FIG. 2 is small, the sensitivity of the discriminator 12 may be increased. Each condition of larger slope and greater sensitivity develops a greater frequency of switching. Another factor determining the switching frequency is the rate of change of the input signal $S_i$, a larger rate of change of the input signal causing a lower switching frequency.

Figure 3:
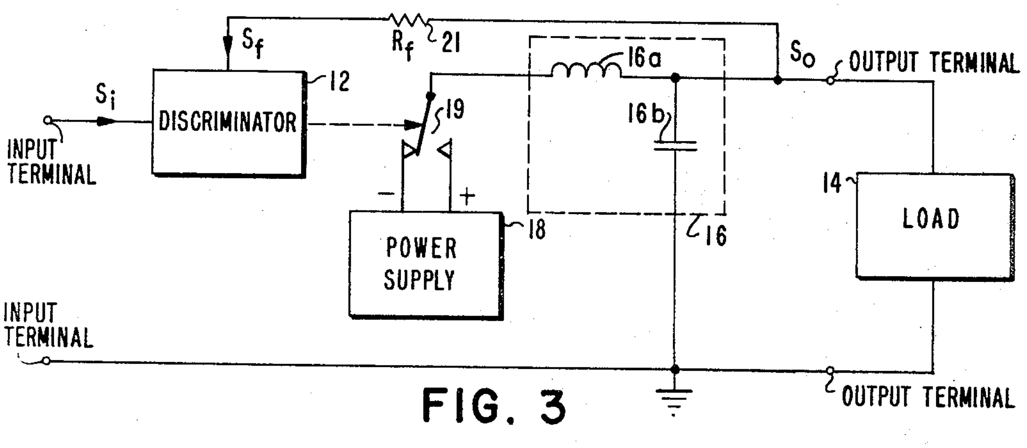
FIG. 3 is a block and schematic diagram of a second embodiment of the invention.

Another embodiment of the invention is shown in FIG. 3, wherein the signal $S_f$ derived from the output and fed to the two state level discriminator 12 is obtained via a resistance 21 ($R_f$) between the load 14 and the discriminator 12. The power supply 18 is instantaneously switched via a single pole, two position switch 19 as shown so as to connect alternately different voltages to the storage network 16, which here is an LC network comprising a series inductance 16*a* and a shut capacitor 16*b*. The resistance 21 provides a predetermined ratio of the signal $S_f$ to the output voltage $S_o$ and may be variable if desired.

Figure 4:
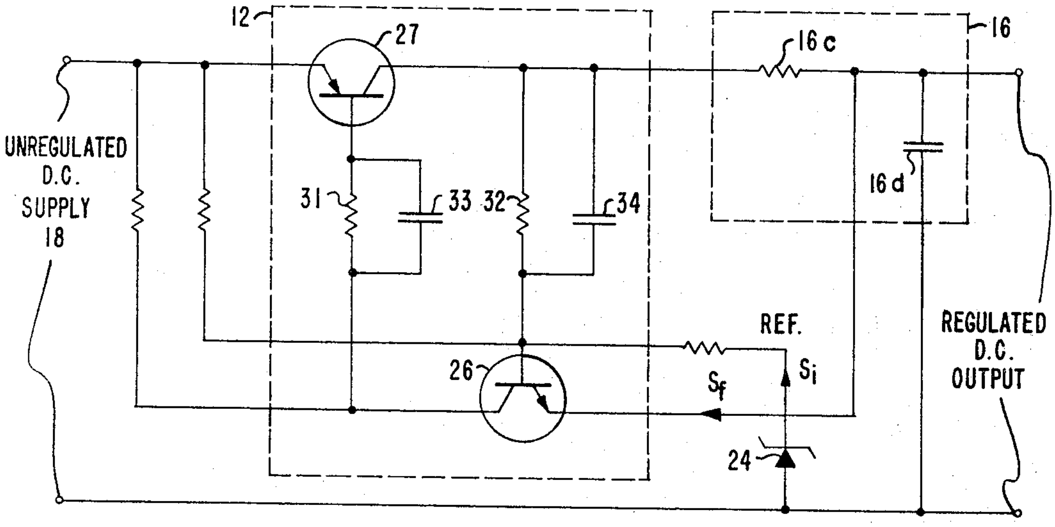
FIG. 4 is a schematic circuit diagram of a third embodiment of the invention showing its use for power supply regulation.

Another embodiment of the invention is shown in FIG. 4 which shows a DC voltage regulator. The unregulated DC supply corresponds to the power supply 18 in FIGS. 1 and 3 and is connected to the two terminals on the left of the diagram. The load may be connected to the two terminals on the right of the diagram. The storage network 16 is here a resistance 16*c* (preferably 1 ohm) in conjunction with a capacitor 16*d*. The input $S_i$ is a reference signal taken from a Zener diode 24. The signal $S_f$ is the output voltage and is shown applied to a control transistor 26. The switch is a series transistor 27 which switches the power from the unregulated power supply to the storage network 16 which develops the output waveform for the load.

The transistor 26 serves as the input stage to the two state level discriminator 12 since the two signals $S_i$ and $S_f$ are connected to its base and emitter respectively. The two state property in the discriminator 12 is obtained with the aid of the switching transistor 27 (shown as part of the discriminator 12) by being intercoupled with 26 so that a positive feedback path with a loop gain greater than unity is present, by virtue of resistances 31, 32 and capacitors 33, 34 which connect the base of each transistor to the collector of the other.

Figure 5:
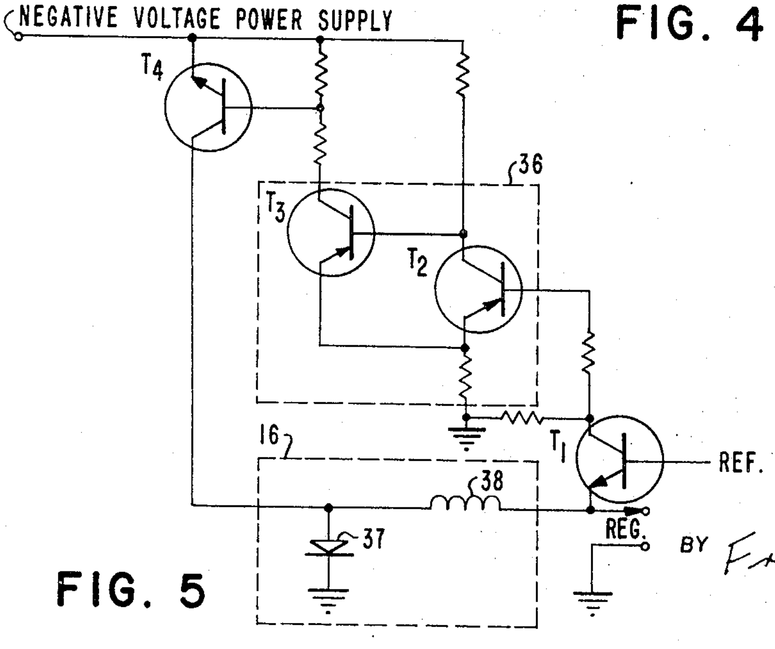
FIG. 5 is a schematic diagram of an alternative power supply regulating circuit in accordance with the invention.

Another embodiment of the invention is shown in FIG. 5 which shows an alternative arrangement for providing a regulated power supply. The terminal "ref." is the input terminal to which the reference signal $S_i$ is applied and corresponds to an amplifier input terminal where an input signal plus a fixed DC bias is applied. In FIG. 5, $T_1$ is a comparator transistor; $T_2$ and $T_3$ comprise a Schmitt trigger circuit 36 which switches $T_4$ the switching transistor 19 into the fully on and fully off states. The diode 37 and inductance 38 comprise the storage network 16.

Figure 6:
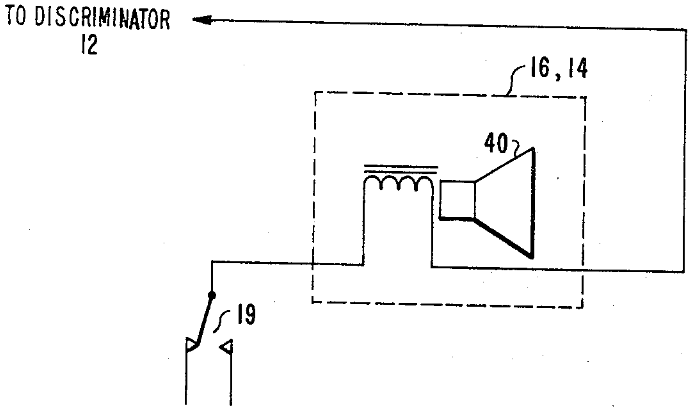
FIG. 6 is a diagram of a portion of the circuit of FIG. 1 showing a particular use thereof.

In another embodiment of the invention incorporating the portion of FIG. 6 in FIG. 1 or 3 the driving coil of a loudspeaker 40 constitutes the storage network 16 and the load 14. In this embodiment the two state level discriminator 12 is arranged to discriminate on current levels.

What is claimed is:

1. An electronic signal transducer for providing an output signal that substantially reproduces the waveform of an input signal comprising:

means providing upper and lower discrete potential levels;

integrating means for providing the output signal;

two-position switching means coupled between the potential level providing means and the integrating means and responsive to first and second control signals to respectively apply the upper or lower discrete potential level to the integrating means, said integrating means responding to the application of said upper discrete potential level to increase the amplitude of the output signal at a fixed rate and responding to the application of said lower discrete potential level to decrease the amplitude of the output signal at a fixed rate; and comparator means coupled to receive the input and output signals for providing the first control signal to the two-position switching means when the amplitude of the output signal exceeds a constant fixed ratio of the input signal by a given amount and for providing the second control signal to the two-position switching means when the constant fixed ratio of the input signal exceeds the output signal by said given amount;

said fixed rate of said integrating means exceeding the maximum time rate of change of the constant fixed ratio of the input signal, whereby the output signal either increases or decreases at said predetermined rate to maintain the difference between the output and the selected ratio of the input signal level no greater than said given amount.

2. A signal transducer arrangement for providing an output signal which is a substantial reproduction of the waveform of an input signal comprising:

means for generating the output signal, said output signal generating means being responsive to first or second control signals to respectively increase or decrease the amplitude of the output signal at a predetermined rate averaging in excess of the maximum time rate of change of a given ratio of the input signal waveform;

feedback means coupled to receive the output signal for providing a predetermined proportion of the output signal inversely related to the given ratio of the input signal waveform; and signal level comparator means coupled to receive the input signal and the predetermined proportion of the output signal from the feedback means for generating the first control signal to reduce the difference in amplitude between the input signal waveform and the predetermined proportion of the output signal whenever said difference exceeds a predetermined level in one direction, and for generating the second control signal to minimize the difference in amplitude between the input signal waveform and the predetermined proportion of the output signal whenever said difference exceeds a predetermined level in the other direction.

3. A signal transducer for providing an output signal substantially reproducing the waveform of an input signal comprising:

source means providing two different voltages;

means for integrating at predetermined rates in response to a respective one of said different voltages being coupled thereto to provide the output signal, said predetermined rates being in excess of the maximum time rate of change of the desired reproduction of the input signal waveform;

means coupled to receive the input and output signals for continuously comparing the amplitude of a fixed proportion of the output signal with the amplitude of the input signal waveform to generate a control signal indicative of the difference in amplitude; and switching means coupled to the comparing means and responsive to the control signal for coupling one of said two different voltages to said integrating means to increase the amplitude of the output signal at a predetermined rate following the occurrence of a first control signal level indicative of a given amplitude difference in one polarity between the input signal waveform and the fixed proportion of the output signal, and for coupling the other of said two different voltages to said integrating means to decrease the amplitude of the output signal at said predetermined rate following the occurrence of a second control signal level indicative of the given amplitude difference in the opposite polarity; whereby the amplitude of the output signal is continuously changed in one direction or the other at said predetermined rate to substantially reproduce the waveform of the input signal.

4. An on-off signal transducer for providing an output signal which is a substantial reproduction of an input signal waveform comprising:

an integrating circuit for providing the output signal;

comparator means coupled to receive the input signal waveform and the output signal for continuously generating a control signal indicative of the difference of amplitude between the input signal waveform and a selected proportion of the output signal; and means coupled to the comparator means and responsive to the control signal for coupling a first discrete potential level to said integrating means to increase the amplitude of the output signal at a predetermined rate whenever the predetermined portion of the output signal is less than the amplitude of the input signal waveform by a given amount and for applying a second discrete potential level to the integrating means to decrease the amplitude of said output signal at a predetermined rate whenever the predetermined proportion of the output signal exceeds the input signal waveform by the predetermined amount.

5. A signal transducer for providing an output signal substantially reproducing the waveform of an input signal with a preselected amplitude ratio comprising:

an integrating means for providing said output signal;

means coupled to the integrating means for applying a first discrete potential level to said integrating means for increasing the amplitude of the output signal at a fixed rate and a second discrete potential level to said integrating means for decreasing the amplitude of the output signal at said fixed rate, said fixed rate being in excess of the maximum frequency component of the input signal;

means coupled to receive said input and output signals for sensing the difference in amplitude between the input signal and the output signal proportioned in accordance with the preselected amplitude ratio; and switching means responsive to said sensing means for coupling said first discrete potential level to increase the amplitude of the output signal when said difference in amplitude exceeds a given level in one sense and for coupling said second discrete potential level to decrease the amplitude of the output signal when said difference in amplitude exceeds the given level in the other sense, such that said integrating means generates an output signal that is continuously increasing or decreasing at said fixed rate between the given levels of difference in amplitude to substantially reproduce said input waveform.

6. A signal transducer for providing an output signal substantially reproducing the waveform of an input signal with a selected amplitude ratio comprising:

an integrating mean for providing the output signal;

means for providing two discrete voltages to be alternately coupled to said integrating means to increase or decrease the amplitude of said output signal at a fixed rate in excess of the maximum rate of change of the input signal;

means coupled to receive the input and output signals for comparing the amplitude of the input signal in the selected ratio with the amplitude of the output signal;

and switching means responsive to said comparing means for coupling said integrating means to receive one of said two discrete voltages when the output signal exceeds the selected ratio of the input signal by a given difference value and for coupling said integrating means to receive the other of two discrete voltages when the output signal is less than the selected ratio of the input signal by the given difference value, whereby the output signal continuously increases or decreases at the selected rate between said difference values established on either side of the waveform that reproduces said input signal in the selected ratio.

7. An electronic signal transducer for providing an output signal that substantially reproduces the waveform of an input signal comprising:

a source of upper an lower discrete potential levels;

a filter network for providing the output signal, said filter network determining the rate of change of the output signal in response to a particular level applied thereto;

switching means responsive to first and second control signals for respectively applying the upper and lower discrete potential levels to the filter network; and comparator means coupled to receive the input and output signals and responsive to signals derived therefrom for providing the first control signal to the switching means to select the upper discrete potential level when the algebraic difference between the derived signals exceeds a predetermined threshold of one polarity and for providing a second control signal to select the lower discrete potential level when the algebraic difference between the derived signals exceeds a predetermined threshold of an opposite polarity;

the average rate of change of the output signal exceeding the maximum rate of change of the input signal.

References Cited

UNITED STATES PATENTS

| | | | |
|---|---|---|---|
| 3,154,746 | 10/1964 | Sciaky | 328—151 |
| 3,154,749 | 10/1964 | Perkins | 328—151 X |
| 3,248,655 | 4/1966 | Kobbe et al. | 328—151 X |

OTHER REFERENCES

Article in IBM Technical Disclosure Bulletin, pp. 33, 34, vol. 3, No. 2, July 1960, "Pulsing Circuit" by Foglia.

NATHAN KAUFMAN, *Primary Examiner.*

U.S. Cl. X.R.

330—12, 40, 199; 328—151; 329—168